US012563238B2

(12) United States Patent
Edpalm et al.

(10) Patent No.: US 12,563,238 B2
(45) Date of Patent: Feb. 24, 2026

(54) ENCODING OF PRE-PROCESSED IMAGE FRAMES

(71) Applicant: Axis AB, Lund (SE)

(72) Inventors: Viktor Edpalm, Lund (SE); Song Yuan, Lund (SE)

(73) Assignee: AXIS AB, Lund (SE)

( * ) Notice: Subject to any disclaimer, the term of this patent is extended or adjusted under 35 U.S.C. 154(b) by 121 days.

(21) Appl. No.: 18/410,396

(22) Filed: Jan. 11, 2024

(65) Prior Publication Data

US 2024/0276023 A1 Aug. 15, 2024

(30) Foreign Application Priority Data

Feb. 9, 2023 (EP) ..................................... 23155752

(51) Int. Cl.
| | |
|---|---|
| *H04N 19/00* | (2014.01) |
| *H04N 19/136* | (2014.01) |
| *H04N 19/172* | (2014.01) |
| *H04N 19/176* | (2014.01) |
| *H04N 19/182* | (2014.01) |
| *H04N 19/184* | (2014.01) |
| *H04N 19/186* | (2014.01) |

(Continued)

(52) U.S. Cl.
CPC ........... *H04N 19/85* (2014.11); *H04N 19/136* (2014.11); *H04N 19/172* (2014.11); *H04N 19/176* (2014.11); *H04N 19/182* (2014.11); *H04N 19/184* (2014.11); *H04N 19/186* (2014.11); *H04N 19/20* (2014.11)

(58) Field of Classification Search
None
See application file for complete search history.

(56) References Cited

U.S. PATENT DOCUMENTS

| | | | |
|---|---|---|---|
| 4,951,140 | A | 8/1990 | Ueno et al. |
| 9,049,450 | B2 | 6/2015 | Hong et al. |

(Continued)

FOREIGN PATENT DOCUMENTS

| | | |
|---|---|---|
| CN | 112055223 A | 12/2020 |
| JP | 2011041190 A | 2/2011 |

(Continued)

OTHER PUBLICATIONS

Communication Pursuant to Article 94(3) EPC issued on Jan. 10, 2024 for European Patent Application No. 23155752.1.

(Continued)

*Primary Examiner* — Zhihan Zhou
(74) *Attorney, Agent, or Firm* — Volpe Koenig

(57) ABSTRACT

A method for encoding an image frame, performed by an image processing device, comprising obtaining image data, and identifying an image area in an image frame based on that the image area fulfilling an identification criterion. The method further comprises determining a bit depth reduction factor for the identified image area by analyzing the image data in the identified image area, and replacing some of the bit values of the pixel values in the identified image area with dummy values. How many of the bit values that are replaced with dummy values is defined by the bit depth reduction factor. The method comprises encoding the image frame upon said some of the bit values having been replaced in the identified image area.

13 Claims, 6 Drawing Sheets

(51) Int. Cl.
  *H04N 19/20*  (2014.01)
  *H04N 19/85*  (2014.01)

(56)  References Cited

U.S. PATENT DOCUMENTS

| | | | | |
|---|---|---|---|---|
| 2007/0253627 A1* | 11/2007 | Islam | .................. | H04N 19/162 |
| | | | | 382/232 |
| 2009/0067506 A1* | 3/2009 | Doser | ................... | H04N 19/60 |
| | | | | 375/E7.076 |
| 2012/0170661 A1* | 7/2012 | Choi | ..................... | H04N 19/40 |
| | | | | 375/E7.123 |
| 2013/0051474 A1 | 2/2013 | Kim et al. | | |
| 2015/0350483 A1* | 12/2015 | Holtsberg | ............ | H04N 19/134 |
| | | | | 348/231.2 |
| 2019/0045210 A1* | 2/2019 | Guermazi | ............ | H04N 19/159 |
| 2022/0210475 A1* | 6/2022 | Goswami | ............ | H04N 19/119 |
| 2022/0224918 A1 | 7/2022 | Maeda | | |

FOREIGN PATENT DOCUMENTS

| | | |
|---|---|---|
| JP | 2013121103 A | 6/2013 |
| KR | 20100111841 A | 10/2010 |
| WO | 2007139534 A1 | 12/2007 |

OTHER PUBLICATIONS

Barnett, B., "Chapter VI: Video Compression" in "Handbook of Image and Video Processing," (2000).

* cited by examiner

510

| x8 | x7 | x6 | x5 | x4 | x3 | x2 | x1 |

MSB                                              LSB 520a                              520b

510'

| x8 | x7 | x6 | x5 | x4 | x3 | | |

MSB                                              LSB 520a                              530

510"

| x8 | x7 | x6 | x5 | x4 | x3 | d2 | d1 |

MSB                                              LSB 520a                              530'

| xi | : bit value xi     | di | : dummy bit value di

ENCODING OF PRE-PROCESSED IMAGE FRAMES

TECHNICAL FIELD

Embodiments presented herein relate to a method, an image processing device, a computer program, and a computer program product for encoding a pre-processed image frame.

BACKGROUND

The use of video surveillance is steadily increasing, and with it comes issues related to storage of encoded video streams. Video streams of decent quality, even when encoded using a compression efficient encoding scheme, consumes storage space, both locally in a surveillance camera as well as in centralized storage (such as cloud storage). Storage space is always associated with a cost. An encoded video stream often needs to be stored until 1) it has been reviewed and deemed unimportant, or 2) the time period during which it could have been relevant has passed. For some installations, the time period in question may be set by legislation. If encoded video streams need to be stored for an extended amount of time, this implies that a significant amount of storage space would be required Some general aspects relating to encoding of video streams will be disclosed next.

In general terms, any video data may be represented as a series of still image frames. Such image frames commonly contain abundant amounts of spatial and temporal redundancy. Video compression algorithms therefore attempt to reduce redundancy and store information more compactly. In this respect, most video compression formats and codecs exploit both spatial and temporal redundancy (e.g., through difference coding with motion compensation). Similarities can be encoded by only storing differences between e.g., temporally adjacent image frames (so-called inter-frame coding) or spatially adjacent pixels (so-called intra-frame coding). Inter-frame compression can be regarded as (re) using data from one or more earlier or later image frames in a sequence to describe the current frame to be encoded. Intra-frame coding, on the other hand, uses only data from within the current image frame, effectively being still-image compression.

Commonly, video compression employs lossy compression techniques, like quantization, that reduce aspects of the source data represented by the image frames that are (more or less) irrelevant to the human visual perception by exploiting perceptual features of human vision. For example, small differences in color are more difficult to perceive than are changes in brightness. Compression algorithms can average a color across these similar areas in a manner similar to those used in still image compression. As in all lossy compression, there is a trade-off between video quality and bit rate, cost of processing the compression and decompression, and system requirements. Highly compressed video may present visible or distracting artifacts.

Even though state-of-the-art video compression schemes can yield high compression rates, most such schemes are based on that the sequence of image frames that are provided as input to the encoder are of a certain bit depth, for example 8 bits per pixel, that is set by the encoder, regardless of the actual image content of the image frames to be encoded. This in turn, can limit the size of the encoded video stream.

Hence, there is still a need for improved encoding of image frames to encoded video streams.

SUMMARY

An object of embodiments herein is to address the above issues and shortcomings with traditional video compression schemes.

A particular object of embodiments herein is to address the specific issue that some traditional video compression schemes are limited to accept image frames of only a certain bit depth.

A particular object of embodiments herein is to reduce the size of the encoded video stream even if traditional video compression schemes still are used to encode the image frames.

A particular object of embodiments herein is to pre-process the image frames such that traditional video compression schemes can still be used to encode the image frames.

According to a first aspect there is presented an image processing device for encoding an image frame. The image processing device comprises processing circuitry. The processing circuitry is configured to cause the image processing device to obtain image data, in terms of pixel values, representing the image frame. Each of the pixel values is represented by respective bit values ranging from a most significant bit value to a least significant bit value. The processing circuitry is configured to cause the image processing device to identify an image area in the image frame based on that the image area fulfils an identification criterion. The processing circuitry is configured to cause the image processing device to determine a bit depth reduction factor for the identified image area by analyzing the image data in the identified image area. The processing circuitry is configured to cause the image processing device to replace some of the bit values of the pixel values in the identified image area with dummy values, starting from the least significant bit value and continuing towards the most significant bit value. How many of the bit values that are replaced with dummy values is defined by the bit depth reduction factor. The processing circuitry is configured to cause the image processing device to encode the image frame upon said some of the bit values having been replaced in the identified image area.

According to a second aspect there is presented a method for encoding an image frame. The method is performed by an image processing device. The method comprises obtaining image data, in terms of pixel values, representing the image frame. Each of the pixel values is represented by respective bit values ranging from a most significant bit value to a least significant bit value. The method comprises identifying an image area in the image frame based on that the image area fulfils an identification criterion. The method comprises determining a bit depth reduction factor for the identified image area by analyzing the image data in the identified image area. The method comprises replacing some of the bit values of the pixel values in the identified image area with dummy values, starting from the least significant bit value and continuing towards the most significant bit value. How many of the bit values that are replaced with dummy values is defined by the bit depth reduction factor. The method comprises encoding the image frame upon said some of the bit values having been replaced in the identified image area.

According to a third aspect there is presented a computer program for encoding an image frame. The computer program comprises computer code which, when run on processing circuitry of an image processing device, causes the image processing device to perform actions. obtain image data, in terms of pixel values, representing the image frame. Each of the pixel values is represented by respective bit values ranging from a most significant bit value to a least significant bit value. One action comprises the image processing device to identify an image area in the image frame based on that the image area fulfils an identification criterion. One action comprises the image processing device to determine a bit depth reduction factor for the identified image area by analyzing the image data in the identified image area. One action comprises the image processing device to replace some of the bit values of the pixel values in the identified image area with dummy values, starting from the least significant bit value and continuing towards the most significant bit value. How many of the bit values that are replaced with dummy values is defined by the bit depth reduction factor. One action comprises the image processing device to encode the image frame upon said some of the bit values having been replaced in the identified image area.

According to a fourth aspect there is presented a computer program product comprising a computer program according to the third aspect and a computer readable storage medium on which the computer program is stored. The computer readable storage medium could be a non-transitory computer readable storage medium.

Advantageously, these aspects enable the above issues and shortcomings with traditional video compression schemes to be resolved.

Advantageously, these aspects enable the image frames to be pre-processed such that traditional video compression schemes still can be used to encode the image frames.

Advantageously, these aspects can be used in combination with traditional video compression schemes to reduce the size of the encoded video stream, even for such traditional video compression schemes that are limited to accept image frames of only a certain bit depth.

Advantageously, by means of the dummy values, these aspects require less information to be encoded in identified image areas than in the remaining parts of the image frame.

Advantageously, these aspects therefore provide bit-efficient encoding of image frames.

Advantageously, the encoding becomes more efficient in that both intra blocks and inter blocks can be encoded with a reduced encoding cost.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
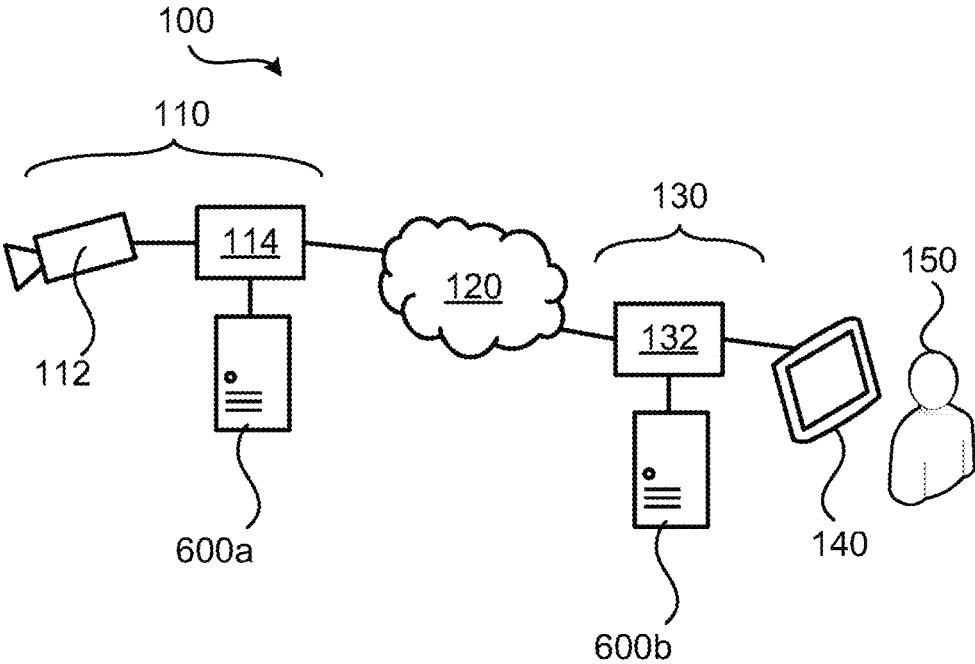
FIG. 1 is a schematic diagram illustrating a system according to embodiments.

FIG. 1 is a schematic diagram illustrating a system 100 where embodiments presented herein can be applied. The system 100 comprises a transmitter 110 and a receiver 130 operatively connected to each other by a network 120. The network 120 might be wired, wireless, or partly wired and partly wireless.

Aspects of the transmitter 110 will be disclosed next. The transmitter 110 comprises a camera device 112. The camera device 112 is configured to capture image frames. In some examples the camera device 112 is a digital camera device and/or capable of pan, tilt and zoom (PTZ) and can thus be regarded as a (digital) PTZ camera device. Further, the transmitter 110 is configured to encode the images such that it can be decoded using any known video coding standard, such as any of: High Efficiency Video Coding (HEVC), also known as H.265 and MPEG-H Part 2; Advanced Video Coding (AVC), also known as H.264 and MPEG-4 Part 10; Versatile Video Coding (VVC), also known as H.266, MPEG-I Part 3 and Future Video Coding (FVC); VP9, VP10 and AOMedia Video 1 (AV1), just to give some examples. In this respect, the encoding might be performed either directly in conjunction with the camera device 112 capturing the image frames or at another entity, such as in a first image processing device 600a, and then, at least temporarily, stored in a database. The camera device 112 and the first image processing device 600a are operatively connected to the network 120 via a first interface entity 114. In some examples, the camera device 112, the first image processing device 600a, and the first interface entity 114 are provided in one and the same device.

Aspects of the receiver 130 will be disclosed next. The receiver 130 comprises a second image processing device 600b. The second image processing device 600b is configured to decode video streams received from the transmitter 110. The second image processing device 600b is therefore operatively connected to the network 120 via a second interface entity 132. Further, the receiver 130 is, via the second interface entity 132, operatively connected to a user interface device 140 with which a user 150 can interact. In some examples the user interface device 140 is a display device, such as a computer monitor, or screen, or a television device. In other examples, the user interface device 140 is a handheld portable device, such as a laptop computer, a tablet computer, or a mobile phone (also referred to as user equipment). In some examples, the user interface device 140, the second image processing device 600b, and the second interface entity 132 are provided in one and the same device.

As noted above, there is still a need for improved encoding of image frames to encoded video streams.

The embodiments disclosed herein therefore relate to techniques for encoding an image frame 210. In order to obtain such techniques there is provided an image processing device 600, a method performed by the image processing device 600, a computer program product comprising code, for example in the form of a computer program, that when run on an image processing device 600, causes the image processing device 600 to perform the method.

Figure 2:
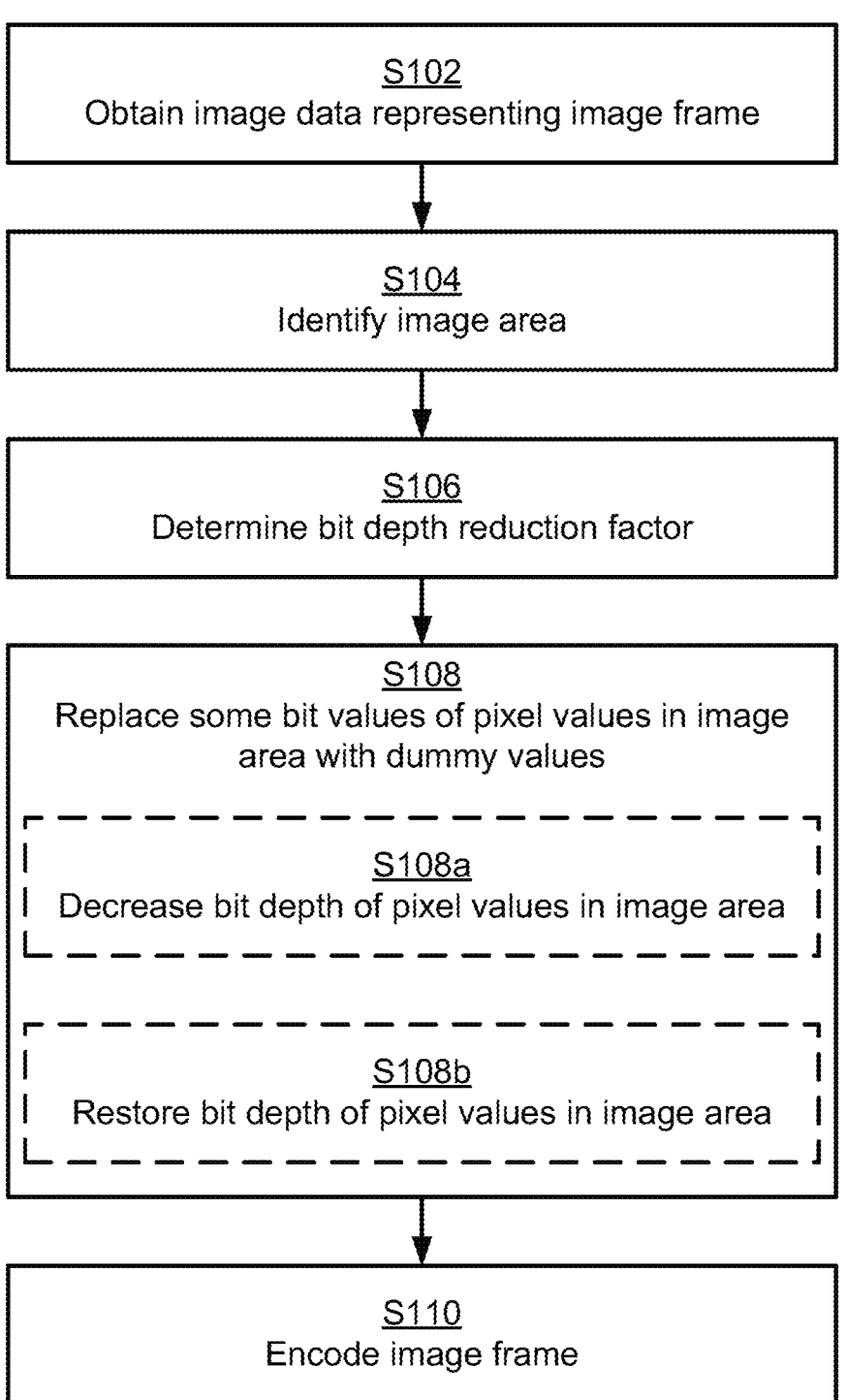
FIG. 2 is a flowchart of methods according to embodiments.

FIG. 2 is a flowchart illustrating embodiments of methods for encoding an image frame 210. The methods are performed by the image processing device 600. The methods are advantageously provided as computer programs 720.

The method is based on pre-processing image data representing an image frame 210 before the image frame 210 is encoded. The purpose is to (virtually) decreasing the bit depth for certain pixels or pixel blocks (e.g., from 8 bits to 6 bits), although keeping the original format of the image frame 210 (e.g., keeping it as an 8-bit frame buffer). This is achieved by replacing some bit values with dummy data (for example zeros) to maintain the same bit depth for all pixels. However, by replacing some bit values with dummy values, the information content (i.e., the information-theoretic entropy) of the image data is reduced, thereby enabling the image frame 210 to be more efficiently encoded (i.e., encoded to less data than if no pre-processing was performed).

S102: The image processing device 600 obtains image data. The image data represents the image frame 210. The image data is obtained in terms of pixel values 510. Each of the pixel values 510 is represented by respective bit values 520a, 520b. The bit values 520a, 520b range from a most significant bit value to a least significant bit value.

Some of the bit values are not replaced with dummy values for all pixels in the image frame 210. Rather, the bit values are only replaced for pixels in one or more image areas 220a, 220b in the image frame 210.

S104: The image processing device 600 identifies an image area 220a, 220b in the image frame 210. The image area 220a, 220b is identified based on that the image area 220a, 220b fulfils an identification criterion.

Examples of identification criteria and examples of conditions for when one or more identification criteria are fulfilled will be disclosed below.

S106: The image processing device 600 determines a bit depth reduction factor for the identified image area 220a, 220b. The bit depth reduction factor is determined by the image processing device 600 analyzing the image data in the identified image area 220a, 220b.

Examples of how the image data in the identified image area 220a, 220b can be analyzed for the image processing device 600 to determine the bit depth reduction factor will be disclosed below.

S108: The image processing device 600 replaces some of the bit values 520b of the pixel values 510 in the identified image area 220a, 220b with dummy values 530'. The bit values 520b are replaced starting from the least significant bit value and continuing towards the most significant bit value. How many of the bit values 520a, 520b that are replaced with dummy values 530' is defined by the bit depth reduction factor.

Further details of how theses bit values 520b of the pixel values 510 in the identified image area 220a, 220b can be replaced with dummy values 530' will be disclosed below.

S110: The image processing device 600 encodes the image frame 210 upon having replaced some of the bit values 520b in the identified image area 220a, 220b in action S108.

Hence, the encoding of the image frame 210 is performed after the image frame 210 has been subjected to pre-processing as represented by actions S102-S108.

Embodiments relating to further details of encoding an image frame 210 as performed by the image processing device 600 will now be disclosed with continued reference to FIG. 2.

As disclosed above, the encoding of the image frame 210 is performed after the image frame 210 has been subjected to pre-processing as represented by actions S102-S108. Reference is here made to FIG. 3 which schematically illustrates three different examples of how the pre-processing of an image frame 210 can be performed in relation to the encoding of the image frame 210. In all examples, an image frame 210 with a bit depth of 8 bits per pixel is to be encoded by an encoder 230. In all examples it is assumed that the bit depth reduction factor corresponds to a bit depth reduction of two bits per pixels, i.e., from 8 bits per pixel to 6 bits per pixel.

Figure 3A:
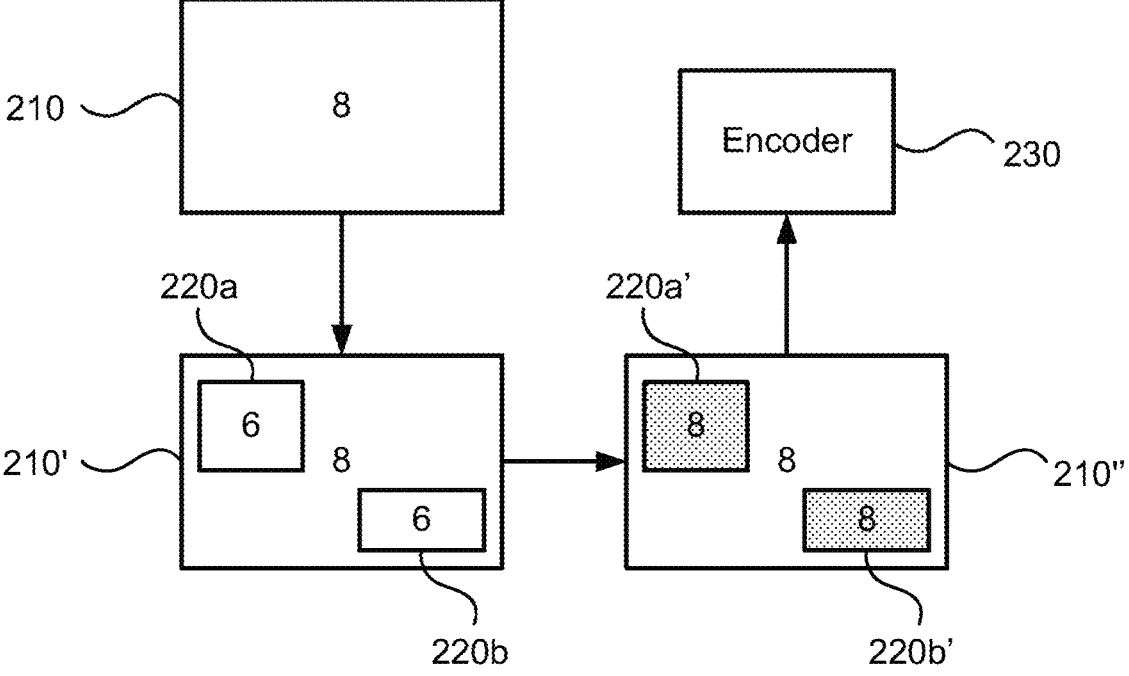
FIGS. 3A-3C schematically illustrate examples of how pre-processing of an image frame can be performed according to embodiments.

In FIG. 3A is illustrated an example where both reduction of the bit depth and restoration of the bit depth are performed outside the encoder 230. In further detail, the image processing device 600 identifies two image areas 220a, 220b in the image frame 210. The bit depth of the two image areas 220a, 220b is reduced to 6 bits per pixels, resulting in image frame 210'. This is achieved by removing bit values from the two least significant bits of the pixels in the two image areas 220a, 220b. The bit depth of the two image areas 220a', 220b' is restored to 8 bits per pixels, resulting in image frame 210". This is achieved by adding dummy values to the two least significant bits of the pixels where the bit depth was reduced from 8 to 6 bits per pixels. The image frame 210" is provided as input to the encoder 230 for encoding.

Figure 3B:
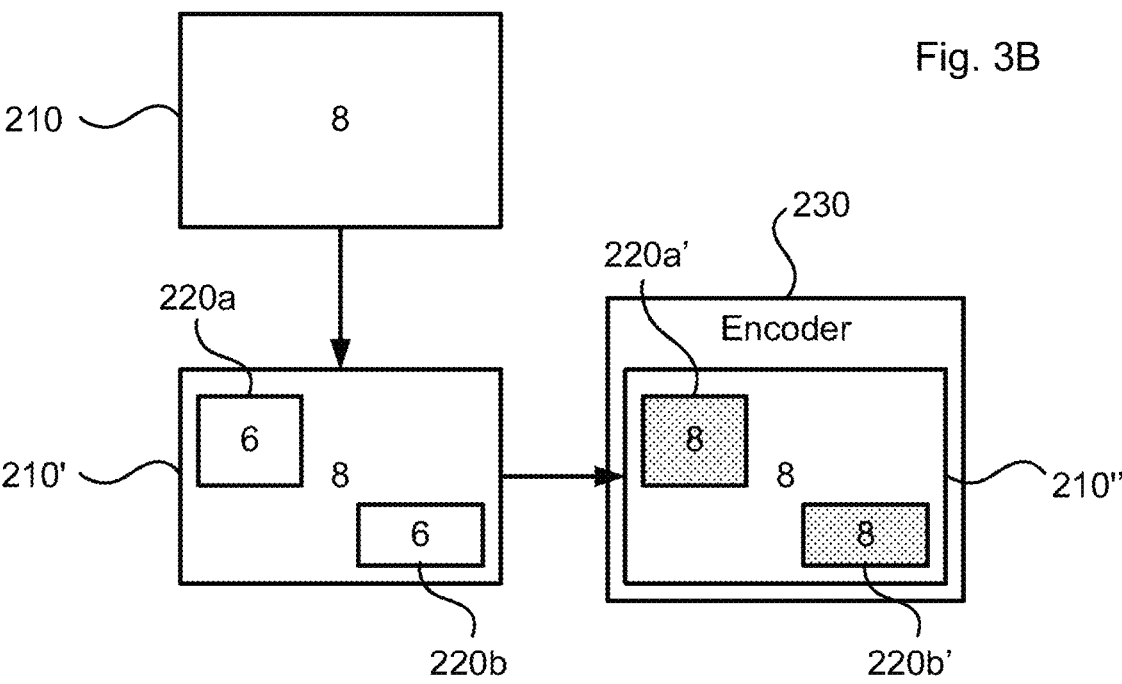

In FIG. 3B is illustrated an example where reduction of the bit depth is performed outside the encoder 230 but where restoration of the bit depth is performed by the encoder 230 but before actual encoding. In further detail, the image processing device 600 identifies two image areas 220a, 220b in the image frame 210. The bit depth of the two image areas 220a, 220b is reduced to 6 bits per pixels, resulting in image frame 210'. This is achieved by removing bit values from the two least significant bits of the pixels in the two image areas 220a, 220b. The image frame 210' is provided as input to the encoder 230. The bit depth of the two image areas 220a', 220b' is restored to 8 bits per pixels, resulting in image frame 210". This is achieved by adding dummy values to the two least significant bits of the pixels where the bit depth was reduced from 8 to 6 bits per pixels. The image frame 210" is then encoded by the encoder 230.

Figure 3C:
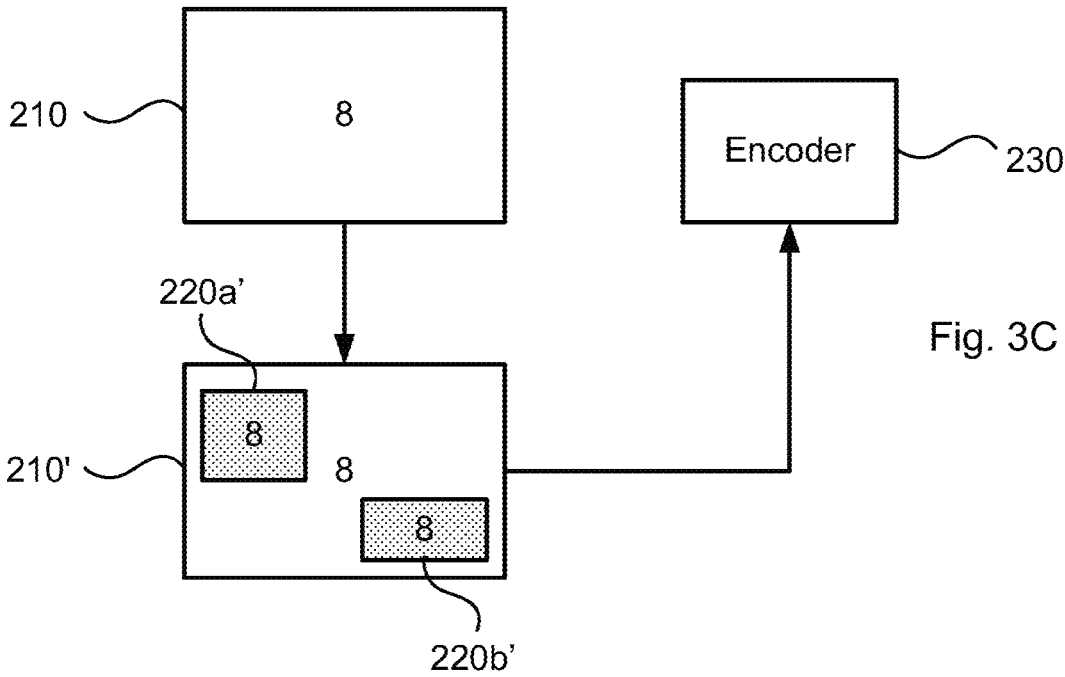

In FIG. 3C is illustrated an example where reduction of the bit depth and restoration of the bit depth are performed as a pure replacement outside the encoder 230. In further detail, the image processing device 600 identifies two image areas 220a', 220b' in the image frame 210. The bit values of the least significant bits of the pixels in the two image areas 220a', 220b' are replaced by dummy values, resulting in image frame 210'. The image frame 210" is then provided as input to the encoder 230 for encoding.

Figures 4A, 4B, 4C:
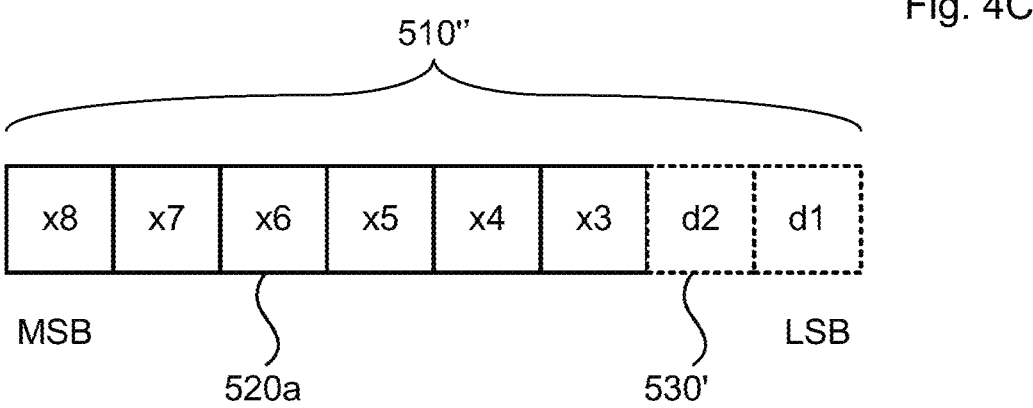
FIGS. 4A-4C schematically illustrate how replacement of bit values can be performed according to embodiments.

As disclosed above, the bit values 520b are replaced starting from the least significant bit value and continuing towards the most significant bit value. Reference is here made to FIG. 4 which schematically illustrates how this replacement can be performed according to an embodiment. In FIG. 4A is schematically illustrated the bits, from the most significant bit (MSB) to the least significant bit (LSB) for one pixel. In the illustrated example, there are 8 bits per pixel, thus enabling the pixel to take a value between 0 and 255, depending on the bit values. That is, in decimal form, the pixel value (denoted pd) for bit values x8, x7, . . . , x1, where x8 is the bit value of the MSB and x1 is the bit value of the LSB, and so on, can be found as:

$$pd = x8 \cdot 2^7 + x7 \cdot 2^6 + x6 \cdot 2^5 + x5 \cdot 2^4 + x4 \cdot 2^3 + x3 \cdot 2^2 + x2 \cdot 2^1 + x1 \cdot 2^0.$$

In FIG. 4B is illustrated the same example as in FIG. 4A but where the bit values of the two LSBs (i.e., the bit values x2 and x1) have been removed, as represented by empty bit values 530. In FIG. 4C is illustrated a continuation of FIG. 4C but where two bit values (i.e., the bit values d2, d1) with dummy values 530' have been inserted in at the two LSBs left empty in FIG. 4B.

As disclosed above, the image area 220a, 220b is identified based on that the image area 220a, 220b fulfils an identification criterion. Further aspects relating thereto will be disclosed next.

In some non-limiting examples, the identification criterion is based on any, or any combination of: signal to noise ratio calculation of the image area 220a, 220b, background-foreground classification of the image area 220a, 220b (in case the image frame depicts a foreground and a background), region of interest classification of the image area 220a, 220b (in case the image frame depicts regions of different interests), object classification of an object depicted in the image area 220a, 220b (in case the image frame depicts objects from different object classes), object identification of an object depicted in the image area 220a, 220b (in case the image frame depicts objects having different identifiers).

In this respect, in some aspects, the image areas are 220a, 220b are selected based on a noise level. For example, dummy values could be used in image areas are 220a, 220b that have more noise than the average noise value for the entire image frame 210. One identification criterion suitable for this case is the signal to noise ratio (SNR) calculation of the image area 220a, 220b. This is since the SNR will identify the amount of bit values per pixel that contain low amounts of information but are expensive to encode (due to representing noise). In general terms, the SNR can be computed as the power of the signal divided by the power of the noise. In the present context, the power of the noise can be estimated as the square root of the signal. Thus yielding that the SNR is the square root of the signal.

Further, in some aspects, the image areas are 220a, 220b are selected based on that they represent the background. One identification criterion suitable for this case is the background-foreground classification of the image area 220a, 220b. For example, dummy values could be used in image areas are 220a, 220b that represent the background. Alternatively, dummy values could be used in image areas are 220a, 220b that represent the foreground but that, for some reason, are uninteresting (e.g., by depicting objects of uninteresting object classes). Which image areas that are background and foreground, respectively, can be provided by a foreground-background model used in image processing.

Still further, in some aspects, image areas 220a, 220b that are considered to be uninteresting or not useful from a forensic perspective, i.e. that have little or no information of forensic value, are pre-processed. Two identification criteria suitable for this case are region of interest classification of the image area 220a, 220b and object classification of an object depicted in the image area 220a, 220b. For example, since region of interest classification can be used to identify areas of interests, it can conversely also be used to identify areas of no interest (represented by those regions that are not identified as regions of interest). Likewise, object classification can be used to identify objects of interest and therefore conversely also be used to identify objects of no interest (represented by those objects that are not identified as objects of interest). Still further, the criterion for which image areas 220a, 220b to be selected can be obtained via user input. Such user input might, for example, specify threshold value for the SNR, one or more regions of interest, one or more object classes of interest, one or more object identifiers of interest, a distance interval between objects that are depicted in the image area and the camera, etc.

Further aspects of conditions for when one or more of the above disclosed identification criteria are fulfilled will be disclosed next.

According to a first example, the identification criterion is fulfilled when the signal to noise ratio for the image area 220a, 220b is lower than a threshold value. According to a second example, the identification criterion is fulfilled when the image area 220a, 220b depicts a background in the image frame 210. According to a third example, the identification criterion is fulfilled when the image area 220a, 220b depicts a non-region of interest in the image frame 210. According to a fourth example, the identification criterion is fulfilled when the image area 220a, 220b depicts an object that is outside an object class of interest. According to a fifth example, the identification criterion is fulfilled when any combination of the above conditions is fulfilled.

Further aspects of how the image data can be analyzed to identify the image area 220a, 220b will be disclosed next.

In general terms, the way in which the image data is analyzed depends on which one or more identification criteria is/are used to identify the image area 220a, 220b.

In one example, the image frame 210 is divided into smaller (non-overlapping) parts and one SNR value is calculated per each such part. In particular, in some embodiments, analyzing the image data (in the identified image area 220a, 220b) comprises calculating an SNR value for the image area 220a, 220b. The bit depth reduction factor can then be determined according to a function of the calculated SNR value for the image area 220a, 220b.

In one example, the bit depth is reduced differently for different types of objects that are depicted. Semantic image segmentation can be applied to identify regions of interest. Different classes of objects generally have different needs with regards to bit depth. This implies that the bit depths of image areas depicting objects of object classes needing different bit depths can be reduced differently. Likewise, object instance segmentation can be applied since different instances of the object class can have different needs with regards to bit depth. In particular, in some embodiments, analyzing the image data in the identified image area 220a, 220b comprises performing object classification to identify objects in the identified image area 220a, 220b. The bit depth reduction factor is a function of which type of object was identified in the identified image area 220a, 220b.

In one example, how much (or even if) the bit depth is to be reduced depends on available metadata for the image area. The more metadata that is available, the more the bit depth can be reduced. For example, if detailed metadata relating to the objects that are depicted in the image area is available, then the bit depth can be reduced more than if such metadata is not available. In particular, in some embodiments, analyzing the image data in the identified image area 220a, 220b comprises checking whether any metadata is available for the identified image area 220a, 220b or not. The bit depth reduction factor is set higher if any metadata is available than if any metadata is not available.

In one example, how much (or even if) the bit depth is to be reduced depends on the distance between objects that are depicted in the image area and the camera. The bit depths for depicted objects located (too) close or (too) far away from the camera can generally be reduced more than if the depicted objects are located at some expected distance with respect to the camera. This is since the probability of using the image data as forensic data decreases if a depicted object is not located at some expected distance with respect to the camera. This is since if a depicted object is located (too) close to the camera, there is a risk that the object will be depicted out-of-focus or that the entire object is not visible. In some non-limiting and illustrative examples, the expected distance extends between from 0.5 meter from the camera to 2.0 meters from the camera. Likewise, if a depicted object is located (too) far away from the camera, there is a risk that the object is not depicted with sufficiently many pixels for a forensic analysis to be meaningful. In particular, in some embodiments, analyzing the image data in the identified image area 220a, 220b comprises comparing a distance to any object depicted in the identified image area 220a, 220b with a distance interval. The distance, can, for example, be determined by use of a distance sensor, or by image analysis of the image frames. The image analysis might involve classifying an object to an object class, estimating the size of the object, and comparing the estimated size of the object to expected sizes of objects of the same object class at different distances. The bit depth reduction factor is higher if the distance to any object is outside the distance interval than if the distance to any object is inside the distance interval.

In some examples, the bit depth reduction factor is selected from a look-up table that is accessible to the first image processing device. Entries in such a look-up table might define different target bit depths, or amount of bit depth reduction to be applied, for different object types, classes, identifiers, etc. as well as for different types of regions of interests, foreground/backgrounds, etc. The entries of the look-up table might be editable by a user or be fixed.

It is here to be noted that the herein disclosed embodiments are applicable also to scenarios where the bitrate in the not yet pre-processed image frame is different for different parts of the image frame. For example, a first part of the image frame might be represented by N1 bits per pixels, where the bit depth is reduced by a bit depth reduction factor n1 and then restored to N1 bits per pixels by means of dummy values, while another part of the area of the image frame might be represented by N2 bits per pixels, where the bit depth is reduced by the bit depth reduction factor n1 and then restored to N2 bits per pixels by means of dummy values. The bit depth of both the first part and the second part are reduced by the same number of bits but to different target bit depths (N1−n1 and N2−n1 bits per pixel, respectively). According to another example, the bit depth of the second part is reduced by a factor n2, where N1−n1=N2−n2. That is, n2=N2−N1+n1. This implies that the first part and the second part have different bit depths from the beginning but that the same target bit depth is the same for both the first part and the second part. This could, for example, be the case where the first part and the second part depict objects of the same object class, etc.

In some aspects, the replacement in action S108 involves explicit removal of some bit values and explicit addition of the dummy values. This can be achieved by first decreasing bit depth for the pixels in the identified image area 220a, 220b from N to N-k bits per pixel and then restoring the bit depth for these pixels back to N bits before encoding. In particular, in some embodiments, the processing circuitry is configured to cause the image processing device 600 to perform (optional) actions S108a and S108b as part of action S108.

S108a: The image processing device 600 decreases bit depth of the pixel values 510' in the identified image area 220a, 220b from a first value to a second, different, value. The bit depth is decreased by removing as many bit values 520b from the pixel values 510 in the identified image area 220a, 220b as given by the bit depth reduction factor, starting from the least significant bit value and continuing towards the most significant bit value.

S108b: The image processing device 600 restores the bit depth of the pixel values 510" in the identified image area 220a, 220b back to the first value. The bit depth is restored by adding the dummy values 530' where the bit values 520b were removed.

Aspects of the dummy values will be disclosed next.

In some examples, a predetermined number of low-order bit values (i.e., LSB values) are replaced with dummy values.

In some examples, all dummy values are equal to binary zero (i.e., the binary value 0) or binary one (i.e., the binary value 1). However, also a combination of binary zeros and binary ones can be used. In some embodiments, the dummy values 530' per bit value 520b are equal for all pixels in the image area 220a, 220b. That is, if the LSB for one pixel value in the image area 220a, 220b takes the value d1 (where d1 is either set to binary zero or binary one), then the LSB of all pixel values in the image area 220a, 220b also takes the value d1. Setting all dummy values equal to binary zero or setting all dummy values equal to binary one might have the most impact on the data size resulting from the encoding. However, the pre-processing will yield a reduction in the data size after encoding as long as the same dummy data is used for the same bit value for all pixels within the image area 220a, 220b.

Although some examples have referred to 8 bits as the bit depth and a bit reduction factor of 2 bits, these are just some exemplary numerical values. The bit depth generally depends on the range of bit values (or single bit value) that is accepted by the encoder 230. The herein disclosed embodiments are therefore not limited to any particular values in this respect. For example, the herein disclosed embodiments are likewise readily applicable to image frames with 10 bits per pixel and/or with a bit reduction factor of 3 bits.

Aspects of the encoding will be disclosed next.

In some examples, the actual encoding and the following decoding is performed without any modifications after the pre-processing has been performed as in actions S102-S108. However, in other examples, also the actual encoding and/or decoding is modified. This modification is performed so as to take advantage of the pre-processing. That is, one purpose of modifying the encoder 230 and/or the decoder is to take into account that some of the bit values that are to be encoded are of no value (since the dummy values do not convey any information).

In some aspects, the actual encoding is modified in that the encoder 230 in the encoded bitstream provides an indication that some image areas 220a, 220b contain some pixel values with some bit values that take dummy values, and hence that these bit values do not need to be recreated during decoding. This is since the dummy values do not convey any information. Therefore, in some embodiments, during the encoding, the identified image area 220a, 220b is flagged as comprising dummy values 530'.

In some aspects, the encoder 230 is modified such that the probability for the image areas 220a, 200b to be encoded as an independent (I) block is reduced. One way to achieve this to modify the actual encoding to increase the cost for encoding the image areas 220a, 200b as an independent (I) block. Therefore, in some embodiments, the image area 220a, 220b is encoded to either an independent (I) block, a predictive (P) block, or a bidirectional predictive (B) block, and the cost for encoding the image area 220a, 220b to the (I) block is increased from a nominal value when the identified image area 220a, 220b comprises dummy values 530'.

The herein disclosed method can be applied to different types of image data, as long as the image data is represented by pixels (that in turn can be represented by bit values). In general terms, the image data might comprise luminance as well as chrominance components. Specifically, each of the pixel values 510 might have a luminance part and two chrominance parts. In some embodiments, one respective bit depth reduction factor is determined for each of the luminance part and the two chrominance parts. For example, if the noise is higher for the two chrominance parts than for the luminance part, then a higher bit depth reduction factor can be used for the two chrominance parts than for the luminance part. That is, the bit depth can be reduced more for the two chrominance parts than for the luminance part. In other examples, each pixel might have three chrominance parts. In some embodiments, one respective bit depth reduction factor is then determined for each of the three chrominance parts.

Figure 5:
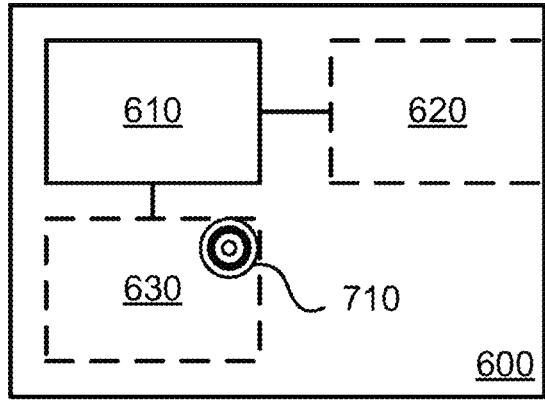
FIG. 5 is a schematic diagram showing functional units of an image processing device according to an embodiment.

FIG. 5 schematically illustrates, in terms of a number of functional units, the components of an image processing device 600 according to an embodiment. Processing circuitry 610 is provided using any combination of one or more of a suitable central processing unit (CPU), multiprocessor, microcontroller, digital signal processor (DSP), etc., capable of executing software instructions stored in a computer program product 310 (as in FIG. 6), e.g. in the form of a storage medium 630. The processing circuitry 610 may further be provided as at least one application specific integrated circuit (ASIC), or field programmable gate array (FPGA).

Particularly, the processing circuitry 610 is configured to cause the image processing device 600 to perform a set of operations, or steps, as disclosed above. For example, the storage medium 630 may store the set of operations, and the processing circuitry 610 may be configured to retrieve the set of operations from the storage medium 630 to cause the image processing device 600 to perform the set of operations. The set of operations may be provided as a set of executable instructions.

Thus, the processing circuitry 610 is thereby arranged to execute methods as herein disclosed. The storage medium 630 may also comprise persistent storage, which, for example, can be any single one or combination of magnetic memory, optical memory, solid state memory or even remotely mounted memory. The image processing device 600 may further comprise a communications (comm.) interface 620 at least configured for communications with other entities, functions, nodes, and devices, as in FIG. 1. As such the communications interface 620 may comprise one or more transmitters and receivers, comprising analogue and digital components. The processing circuitry 610 controls the general operation of the image processing device 600 e.g. by sending data and control signals to the communications interface 620 and the storage medium 630, by receiving data and reports from the communications interface 620, and by retrieving data and instructions from the storage medium 630. Other components, as well as the related functionality, of the image processing device 600 are omitted in order not to obscure the concepts presented herein.

The image processing device 600 may be provided as a standalone device or as a part of at least one further device. Thus, a first portion of the instructions performed by the image processing device 600 may be executed in a first device, and a second portion of the of the instructions performed by the image processing device 600 may be executed in a second device; the herein disclosed embodiments are not limited to any particular number of devices on which the instructions performed by the image processing device 600 may be executed. Hence, the methods according to the herein disclosed embodiments are suitable to be performed by an image processing device 600 residing in a cloud computational environment. Therefore, although a single processing circuitry 610 is illustrated in FIG. 5 the processing circuitry 610 may be distributed among a plurality of devices, or nodes. The same applies to the computer program 720 of FIG. 6.

Figure 6:
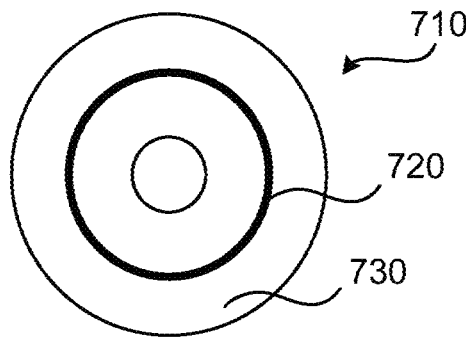
FIG. 6 shows one example of a computer program product comprising computer readable storage medium according to an embodiment.

FIG. 6 shows one example of a computer program product 710 comprising computer readable storage medium 730. On this computer readable storage medium 730, a computer program 720 can be stored, which computer program 720 can cause the processing circuitry 610 and thereto operatively coupled entities and devices, such as the communications interface 620 and the storage medium 630, to execute methods according to embodiments described herein. The computer program 720 and/or computer program product 710 may thus provide means for performing any steps as herein disclosed.

In the example of FIG. 6, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. An image processing device for encoding an image frame, the image processing device comprising processing circuitry being configured to cause the image processing device to:

obtain image data, in terms of pixel values, representing the image frame, wherein each pixel value is represented by respective bit values ranging from a most significant bit value to a least significant bit value;

identify an image area in the image frame based on that the image area fulfilling an identification criterion;

determine a bit depth reduction factor for the identified image area by analyzing the image data in the identified image area;

replace some of the bit values of the pixel values in the identified image area with dummy values, starting from the least significant bit value and continuing towards the most significant bit value, wherein how many of the bit values that are replaced with dummy values is defined by the bit depth reduction factor; and encode the image frame upon said some of the bit values having been replaced in the identified image area, wherein the image area is encoded to an independent block, a predictive block, or a bidirectional predictive block, and wherein the cost for encoding the image area to the independent block is increased from a nominal value when the identified image area comprises dummy values.

2. The image processing device according to claim 1, wherein the identification criterion is based on one or more of:

signal to noise ratio calculation of the image area, background-foreground classification of the image area, region of interest classification of the image area, object classification of an object depicted in the image area, or object identification of an object depicted in the image area.

3. The image processing device according to claim 1, wherein the identification criterion is fulfilled when one or more of the following is true:

signal to noise ratio for the image area is lower than a threshold value, the image area depicts a background in the image frame, the image area depicts a non-region of interest in the image frame, or the image area depicts an object that is outside an object class of interest.

4. The image processing device according to claim 1, wherein analyzing the image data in the identified image area comprises calculating a signal to noise ratio for the image area, and wherein the bit depth reduction factor is a function of the calculated signal to noise ratio for the image area.

5. The image processing device according to claim 1, wherein analyzing the image data in the identified image area comprises performing object classification to identify objects in the identified image area, and wherein the bit depth reduction factor is a function of which type of object was identified in the identified image area.

6. The image processing device according to claim 1, wherein analyzing the image data in the identified image area comprises checking whether any metadata is available for the identified image area or not, and wherein the bit depth reduction factor is set higher if any metadata is available than if any metadata is not available.

7. The image processing device according to claim 1, wherein analyzing the image data in the identified image area comprises comparing a distance to any object depicted in the identified image area with a distance interval, and wherein the bit depth reduction factor is higher if the distance to said any object is outside the distance interval than if the distance to said any object is inside the distance interval.

8. The image processing device according to claim 1, wherein the processing circuitry further is configured to cause the image processing device to, as part of replacing said some of the bit values:

decrease bit depth of the pixel values in the identified image area from a first value to a second, different, value, by removing as many bit values from the pixel values in the identified image area as given by the bit depth reduction factor, starting from the least significant bit value and continuing towards the most significant bit value; and restore the bit depth of the pixel values in the identified image area back to the first value by adding the dummy values where the bit values were removed.

9. The image processing device according to claim 1, wherein each pixel value has a luminance part and two chrominance parts, and wherein one respective bit depth reduction factor is determined for each of the luminance part and the two chrominance parts.

10. The image processing device according to claim 1, wherein the dummy values per bit value are equal for all pixels in the image area.

11. The image processing device according to claim 1, wherein during the encoding, the identified image area is flagged as comprising dummy values.

12. A method for encoding an image frame, the method being performed by an image processing device, the method comprising:

obtaining image data, in terms of pixel values, representing the image frame, wherein each pixel value is represented by respective bit values ranging from a most significant bit value to a least significant bit value;

identifying an image area in the image frame based on that the image area fulfils an identification criterion;

determining a bit depth reduction factor for the identified image area by analyzing the image data in the identified image area;

replacing some of the bit values of the pixel values in the identified image area with dummy values, starting from the least significant bit value and continuing towards the most significant bit value, wherein how many of the bit values that are replaced with dummy values is defined by the bit depth reduction factor; and encoding the image frame upon said some of the bit values having been replaced in the identified image area, wherein the image area is encoded to an independent block, a predictive block, or a bidirectional predictive block, and wherein the cost for encoding the image area to the independent block is increased from a nominal value when the identified image area comprises dummy values.

13. A non-transitory computer readable recording medium comprising a computer program for encoding an image frame, the computer program comprising computer code which, when run on processing circuitry of an image processing device, causes the image processing device to:

obtain image data, in terms of pixel values, representing the image frame, wherein each pixel value is represented by respective bit values ranging from a most significant bit value to a least significant bit value;

identify an image area in the image frame based on that the image area fulfils an identification criterion;

determine a bit depth reduction factor for the identified image area by analyzing the image data in the identified image area;

replace some of the bit values of the pixel values in the identified image area with dummy values, starting from the least significant bit value and continuing towards the most significant bit value, wherein how many of the bit values that are replaced with dummy values is defined by the bit depth reduction factor; and encode the image frame upon said some of the bit values having been replaced in the identified image area, wherein the image area is encoded to an independent block, a predictive block, or a bidirectional predictive block, and wherein the cost for encoding the image area to the independent block is increased from a nominal value when the identified image area comprises dummy values.

* * * * *